United States Patent
Phillips

(10) Patent No.: US 10,210,512 B2
(45) Date of Patent: Feb. 19, 2019

(54) TRANSACTION COUNT SYNCHRONIZATION IN PAYMENT SYSTEM

(75) Inventor: Simon Phillips, York (GB)

(73) Assignee: Mastercard International Incorporated, Purchase, NY (US)

( * ) Notice: Subject to any disclaimer, the term of this patent is extended or adjusted under 35 U.S.C. 154(b) by 2904 days.

(21) Appl. No.: 11/674,316

(22) Filed: Feb. 13, 2007

(65) Prior Publication Data

US 2008/0195549 A1 Aug. 14, 2008

(51) Int. Cl.
*G06Q 20/38* (2012.01)
*G06Q 20/30* (2012.01)
*G06Q 20/20* (2012.01)

(52) U.S. Cl.
CPC ........... *G06Q 20/385* (2013.01); *G06Q 20/20* (2013.01); *G06Q 20/382* (2013.01)

(58) Field of Classification Search
USPC ....................................... 705/1–79
See application file for complete search history.

(56) References Cited

U.S. PATENT DOCUMENTS

| | | | | |
|---|---|---|---|---|
| 5,613,012 A * | 3/1997 | Hoffman | ................. | G06F 21/32 235/380 |
| 5,892,211 A * | 4/1999 | Davis | ................... | G06Q 20/341 235/375 |
| 6,915,279 B2 * | 7/2005 | Hogan et al. | .................. | 705/64 |
| 7,058,611 B2 * | 6/2006 | Kranzley et al. | ............... | 705/64 |
| 2005/0033688 A1 * | 2/2005 | Peart et al. | ..................... | 705/39 |
| 2006/0294526 A1 * | 12/2006 | Hambrick | ................ | G06F 8/20 719/315 |
| 2007/0198432 A1 * | 8/2007 | Pitroda | .................. | G06Q 20/02 705/64 |
| 2008/0109494 A1 * | 5/2008 | Chitre | .............. | G06F 17/30575 |
| 2008/0154770 A1 * | 6/2008 | Rutherford et al. | ........... | 705/44 |

OTHER PUBLICATIONS

PayPass Information Paper, "ATC Regeneration and Tracking", MasterCard International, Version 1.4, Oct. 26, 2004. 10pgs.

* cited by examiner

*Primary Examiner* — Abhishek Vyas
*Assistant Examiner* — Murali K Dega
(74) *Attorney, Agent, or Firm* — Buckley, Maschoff & Talwalkar LLC

(57) ABSTRACT

A payment system transaction authorization server computer, or another computer, performs calculations to determine a transaction count value stored in a payment device for which a transaction authorization request was sent to the authorization server computer. The computer in question "guesses" appropriate transaction count values, and then attempts to duplicate an encryption calculation result that was originally generated by the payment device and that was included in the transaction authorization request.

10 Claims, 9 Drawing Sheets

TRANSACTION COUNT SYNCHRONIZATION IN PAYMENT SYSTEM

BACKGROUND

Payment cards containing an electronic circuit capable of performing cryptographic calculations are in widespread use by the payment industry. Payment cards which contain an electronic circuit that communicates with a POS terminal through contacts on the surface of the card typically conform to the international payment card standard EMV. Proximity payment cards and devices also use electronic circuits that have cryptographic capabilities and communicate by wireless radio frequency signals with a proximity reading device included in a POS terminal. Accordingly, proximity payment cards and other proximity payment devices are based on RFID ICs (radio frequency identification integrated circuits). A well known standard for proximity payment cards has been promulgated by MasterCard International Incorporated, the assignee hereof, and is referred to as "PayPass".

According to EMV, PayPass and similar standards for electronic payment devices, the cardholder's payment device may hold a counter that keeps a running count of the number of times the payment device has been presented to a POS terminal to undertake a payment transaction. This counter, included and described in both EMV and PayPass standards, is sometimes known as the Application Transaction Counter or "ATC".

In order to prevent certain kinds of card fraud, the value of the ATC is used as an input to cryptographic calculations performed by the cardholder's payment device. A result of the cryptographic calculations is communicated to the authorization server of the issuer financial institution as part of the transaction process. The financial institution, with knowledge of the cryptographic keys held by the electronic payment device, can verify that the transaction has been generated by a particular payment device. This process also allows for detection of transactions that have already been submitted.

To obviate minor discrepancies between the counts maintained in the payment device and the authorization server, the payment device may, as part of the transaction, transmit to the POS terminal the current ATC value stored in the device. At least a portion of the ATC from the payment device may be passed to the authorization server as part of the authorization request from the POS terminal and used, together with the server's transaction count, to recreate the cryptographic calculation performed in the payment device.

In some situations, only low-order digits of the ATC are sent to the authorization server as part of the transaction; accordingly, the authorization server may be required to have an accurate record of the higher-order digits of the current ATC as held by the payment device. However, there may be situations in which the authorization server lacks data that reflects the high-order digits of the ATC as stored in the payment device. For example, authorization processing may be shifted from one transaction processing system to another (e.g., when an existing population of cardholder accounts is acquired by one issuer from another) but it may be infeasible or undesirable for the transaction count synchronization information to be transferred to the new authorization server.

DETAILED DESCRIPTION

In general, and for the purpose of introducing concepts of embodiments of the present invention, a computer operated by a payment device issuer uses information received in connection with one or more payment transaction authorization requests to determine an ATC stored in a payment device that initiated the authorization request or requests, in a case where the issuer lacks information (or reliable information) about the ATC for that particular device. In one variation, the issuer computer "guesses" the current transaction count value as maintained by the payment device for which an authorization request was received. Using the guessed transaction count value, the issuer computer attempts to verify the card verification code that was included in the request and was generated by the payment device by performing encryption calculations. In some variations, if the verification attempt fails, the issuer guesses another transaction count value and re-tries the code verification, continuing to guess again and to re-try code verification, until verification succeeds, thereby confirming that the most recently guessed transaction count value is correct. In some variations, the issuer computer uses data from one or more other authorization requests to verify the correctness of the transaction count value. In this way the issuer may be able to synchronize its transaction counting with that of the payment device.

Figure 1:
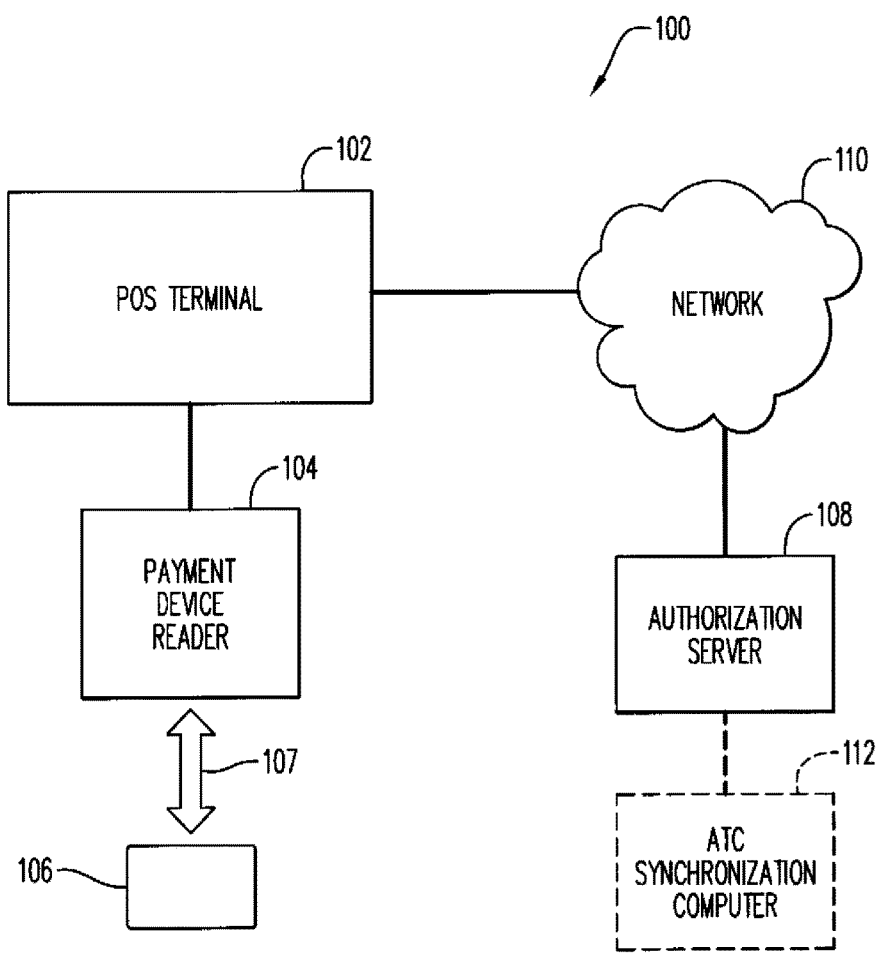
FIG. 1 is a simplified block diagram of a transaction payment system in which the present invention may be applied.

FIG. 1 is a simplified block diagram representation of a payment transaction system 100 in which the present invention may be applied.

The payment transaction system 100 includes a point of sale terminal 102, which may for example be located in a retail store. The point of sale terminal may include and/or be coupled to a payment device reader 104 which is configured to receive payment account information from payment devices presented by customers/payment account holders. For example, the reader 104 may transmit a wireless interrogation signal of the kind required to power-up and interrogate proximity payment devices such as payment cards that embody RFID (radio frequency identification) chips. In addition or alternatively, the reader 104 may have a set of contacts of the kind required to provide power and signal coupling to payment cards of the type which are read via electrically conductive contact with the reader. (Although only one POS terminal and payment device reader are shown, it will be appreciated that in practice the system may include numerous POS terminals and payment device readers.)

The payment transaction system 100 also includes numerous payment devices carried and used by payment account holders. One such payment device, which may—but need not—be card-shaped, is indicated by reference numeral 106. The double-arrow mark 107 is representative of an exchange of information between the payment device 106 and the reader 104/POS terminal 102 as part of a payment transaction. The payment devices may operate entirely in a conventional manner. For example, each payment device may store a respective ATC, as referred to above, which represents a count of the number of payment transactions for which the payment device has been presented to a POS/reader. For each transaction, the POS/reader may generate an "unpredictable" number. This number may be transmitted by the POS/reader to the payment device for use by the payment device as an input to a series of encryption calculations performed by the payment device for the transaction to generate a security code (sometimes referred to as a "card verification code") for the transaction. The ATC and an "initialization value" (which may be derived in a confidential manner from the account number) are additional inputs for the encryption calculations, along with a secret key. The security code is a result (or more likely, a partial result) of the encryption calculations, and is transmitted from the payment device to the POS/reader, together with the payment account number and one or more low-order digits of the ATC.

The payment transaction system 100 also includes a transaction authorization server computer ("authorization server") 108, with which the POS terminal 102 may exchange communications, at least from time to time, via a data communication network 110. The authorization server 108 is typically operated by or on behalf of the issuer (issuing financial institution) of the payment device. The components of the system 100 may operate in a conventional manner (e.g., in compliance with the PayPass standard) except for certain processes described below that may be utilized to synchronize the issuer's data with the ATC currently stored in the payments device(s). Generally speaking, the POS terminal may transmit a payment transaction authorization request to the authorization server 108 via the communication network 110. The payment transaction authorization request may include the account number, the "unpredictable" number generated for the transaction by the POS terminal, the security code cryptographically generated for the transaction by the payment device, and the low-order digit or digits of the ATC stored in the payment device.

The data communication network 110 may effectively include one or more servers (not separately shown), such as an acquiring bank server, as well as one or more public and/or private telecommunication networks (not separately shown).

As discussed briefly above, the present disclosure is concerned with situations in which the issuer does not have reliable data (or has no data whatsoever) to reflect the ATCs maintained in the payment devices issued by the issuer. In some embodiments, the authorization server itself may be operated to synchronize the issuer's data with the payment device ATCs. However, in other embodiments, this function may be relegated to a computer 112 (FIG. 1) which is separate from the server computer but which is included in the payment transaction system 100 (e.g., by being connected to the authorization server 108, as shown). Either or both of the authentication server 108 and the ATC synchronization computer 112 may be also be used for functions other than those described herein.

Figure 2:
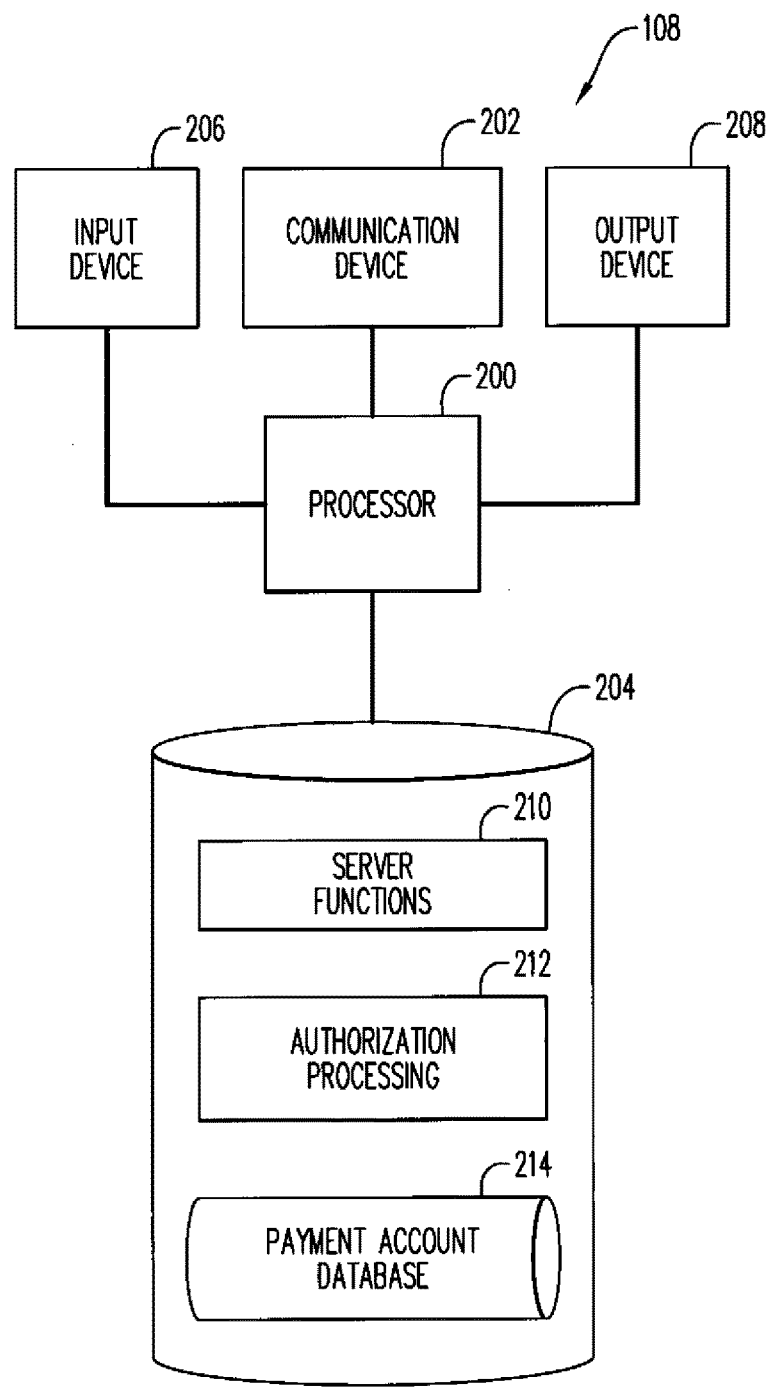
FIG. 2 is a simplified block diagram of a transaction authorization server computer that is part of the system of FIG. 1.

FIG. 2 is a simplified block diagram of the authorization server 108 that is shown in FIG. 1.

The authorization server 108 may include a computer processor 200 operatively coupled to a communication device 202, a storage device 204, an input device 206 and an output device 208.

The computer processor 200 may be constituted by one or more conventional processors. Processor 200 operates to execute processor-executable steps, contained in program instructions described below, so as to control the authorization server 108 to provide desired functionality.

Communication device 202 may be used to facilitate communication with, for example, other devices (such as the POS terminal 102 shown in FIG. 1, and/or one or more acquiring bank server computers, which are not separately shown).

Input device 206 may comprise any type of peripheral device typically used to input data into a computer. Output device 208 may comprise, for example, a display and/or a printer.

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 204 stores one or more programs for controlling processor 200. The programs comprise program instructions that contain processor-executable process steps of authorization server 108, including, in some cases, process steps that constitute processes provided in accordance with principles of the present invention, as described in more detail below.

The programs may include an application 210 that allows the authorization server 108 to function as a server computer serving requests from other devices. In addition the programs may include an application 212 that controls the authorization server to process and respond to requests to authorize payment card transactions.

Storage device 204 may also store a database 214 that contains data concerning a universe of payment accounts. There may also be stored in storage device 204 other unshown elements that may be necessary for operation of the authorization server 108, such as an operating system, a database management system, other applications, other data files, etc.

The ATC synchronization computer 112 (FIG. 1), if present, may be similar in its hardware construction to the authorization server 108 as just described, but may be programmed with different software from the authorization server 108.

Before proceeding with a description of aspects of the invention related to ATC synchronization, this disclosure will first describe how an authorization server conventionally utilizes ATC data in cases where reliable ATC data is stored in the authorization server. For purposes of this description it is assumed that the authorization server stores, for each issued payment device, ATC data that reflects with reasonable accuracy the ATC value currently maintained in the corresponding payment device.

When the authorization server receives a payment transaction authorization request, the data that is part of the request includes the security code cryptographically generated for the transaction by the payment device, the account number, the "unpredictable number" generated for the transaction by the POS terminal, and the low-order digit or digits of the ATC. The authorization server then "regenerates" the ATC using the low-order digit or digits received in the authorization request and the ATC data stored in the authorization server for the payment device which originated the authorization request. For example, if the low-order digit or digit of the ATC data stored in the authorization server for the payment device matches the low-order digit or digits received in the authorization request, then the authorization server simply uses the ATC data that it stored as the regenerated ATC for the payment device. Otherwise, the authorization server concatenates the low-order ATC digit or digits received in the authorization request with the high-order digit or digits of the ATC data stored by the authorization server for the payment device, to produce the regenerated ATC. The authorization server can also generate the initialization value from the account number by an algorithm that is known to the authorization server. In addition, the authorization server has the ability to use the secret key that the payment device used as one of the inputs to the encryption calculation performed by the payment device to produce the security code. The authorization server thus has all of the inputs needed to duplicate the encryption calculation that was performed by the payment device to produce the security code. The authorization server then proceeds with the identical encryption calculation algorithm that the payment device used. If the result (or partial result) matches the security code, the authorization server authorizes the transaction (assuming adequate funds or credit are available in the corresponding account). If the result does not match the security code, and if only one ATC digit was included in the authorization request, the authorization server may perform the encryption calculation once or twice again, using the ATC value that is greater by 10 or less by 10 than the regenerated ATC value that the authorization server initially used as an input to the encryption calculation. (In some instances, the issuer of the payment device may prescribe testing of a larger range of possible ATC values around the first regenerated ATC value.) If the result of the encryption calculation(s) still does not match the security code, then authorization is denied. Such is also the case if two or more ATC digits were included in the authorization request and the result of the initial encryption calculation performed by the authorization server did not match the security code.

This completes the description of the conventional use of ATC data stored in the authorization server. The present disclosure will now proceed to describe novel processes for allowing an issuer to synchronize its ATC data with the payment device ATCs. This might need to be done, for example, in the case of an issuer that initially did not check the security code or track the payment device ATCs, but that decided at a later time that it wishes to begin to perform these security functions.

Convenience and/or limited processing capacity at the authorization server 108 may, in accordance with some embodiments, lead the issuer to perform ATC synchronization processing as a batch process on the separate computer 112. (Alternatively, the authorization server 108 may perform the batch process described below.) The batch process may be offline relative to the normal operation of the authorization server. Such a batch process is illustrated in the flow chart formed by FIGS. 3A and 3B. It is assumed that, at least until ATC synchronization processing has been performed, the authorization server does not check securities codes submitted with the authorization requests.

Figure 3A:
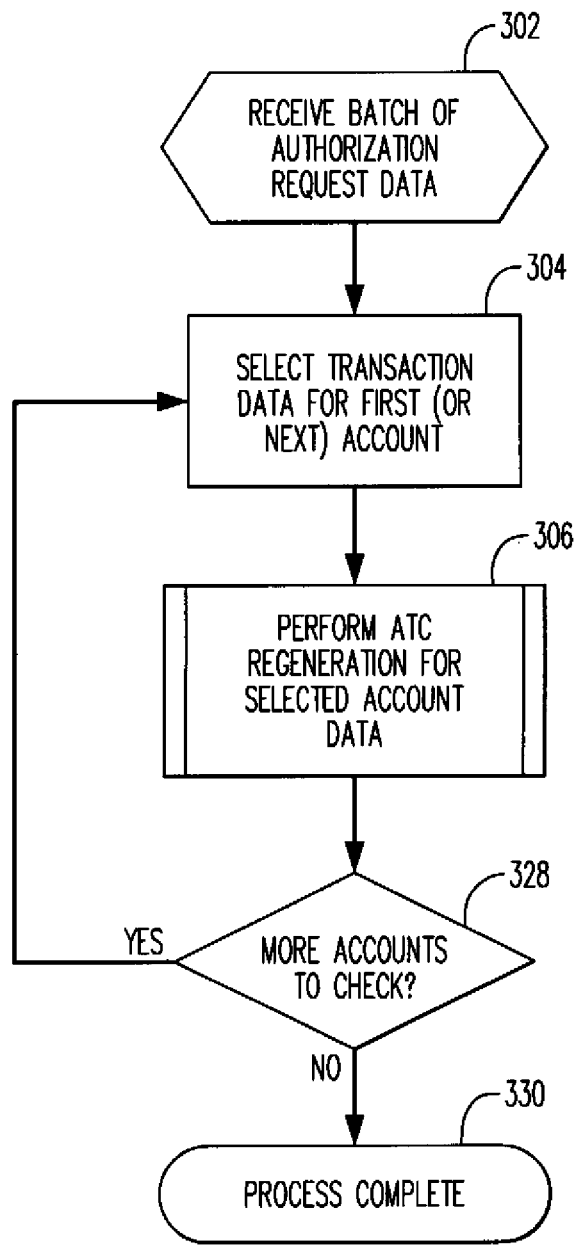
FIGS. 3A and 3B together form a flow chart that illustrates a process performed in accordance with aspects of the present invention by a computer that may be included in the system of FIG. 1.
Figure 3B:
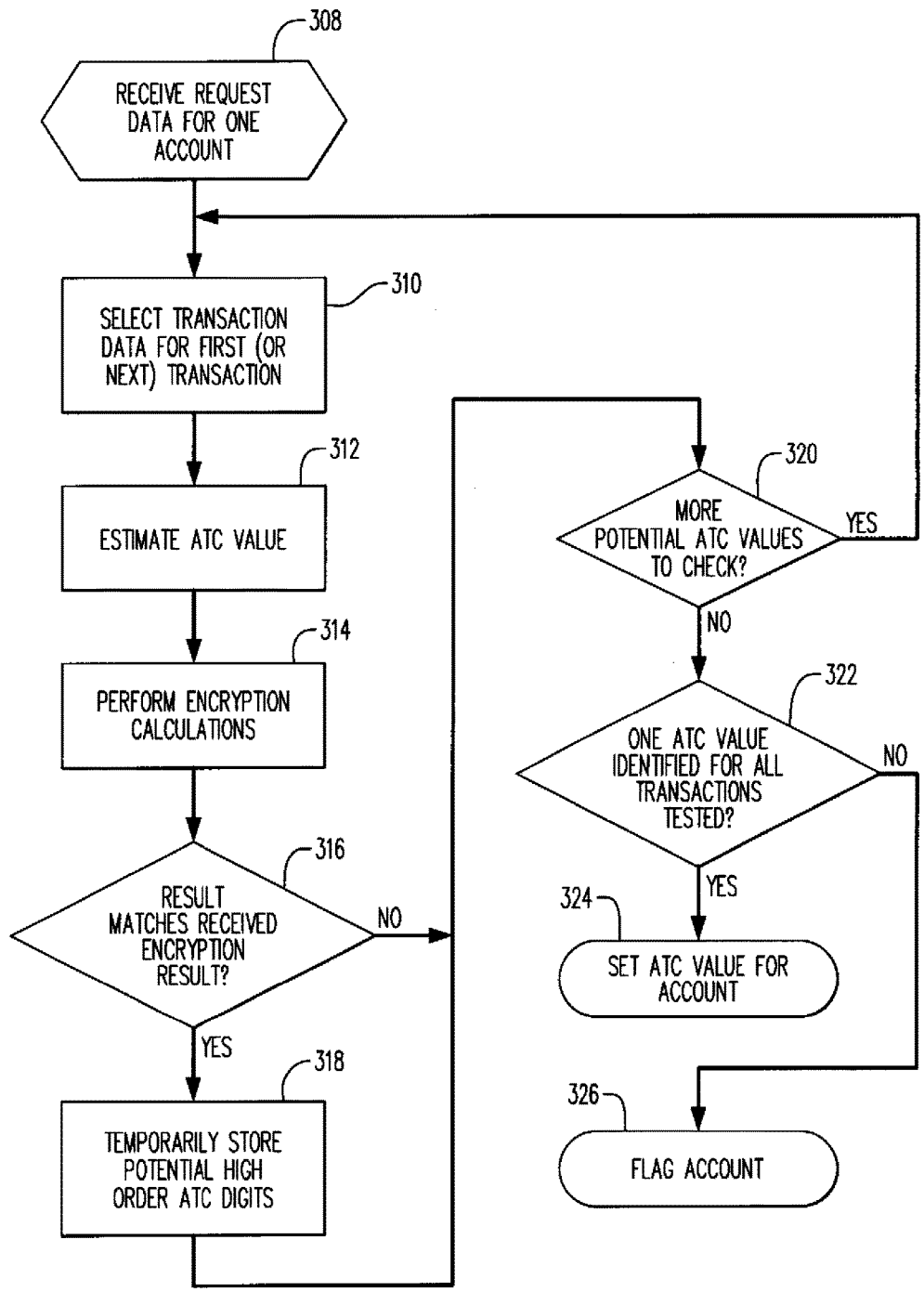

The process of FIGS. 3A-3B begins at 302 in FIG. 3A with the ATC synchronization computer 112 receiving (e.g., from the authentication server 108) a batch of data from a number (potentially a large number) of payment transaction authorization requests. The information received for each transaction, as indicated before, may include the security code, the low-order digit or digits of the payment device ATC, and the "unpredictable number" generated for that transaction. Depending on the number of low-order ATC digits supplied by the payment devices, and hence included in the transaction data received by the ATC synchronization server, it may be preferable for the batch of transaction data to include a number of different requests for each account. That is, if the number of low-order ATC digits supplied by the payment device is only one or two, there is an increased likelihood that the process described below may produce at least one "false positive"—i.e., an ATC value that results in matching the security code but that is in fact not the same as the ATC value that was actually in the payment device at the time of the transaction. The chance of a false positive ATC value can be greatly reduced by cross-checking the ATC values found by using two or more different transactions for the same account. If the same ATC value is produced by considering two or more transactions, there may be a high probability that it is correct.

Next, at 304 in FIG. 3A, transaction data is selected from the batch of data for the first account to be subjected to ATC synchronization processing. Process block 306 follows 304, and represents the ATC synchronization process performed with respect to the selected account. FIG. 3B shows details of the process block 306.

Turning then to FIG. 3B, block 308 indicates that the processing function of the ATC synchronization computer has received the data received in the past by the authorization server with respect to all of the authorization request in the batch for the currently selected account. Then, at 310, data for one of the transaction for that account is selected. Next, at step 312 the ATC synchronization computer estimates the transaction count value that was used for the current transaction (in the batch) by the payment device in question. For the low-order digit(s) of the estimated ATC value, of course the low-order digit(s) supplied with the authorization request data are used. To estimate the high-order digits, for example, the ATC synchronization computer may consider the date of the transaction and the date on which the payment device was issued, and may use the typical number of transactions performed by a payment device in a period of time of such length.

Then, at 314, the ATC synchronization computer may use the estimated ATC value as an input in attempting to duplicate the encryption calculation performed for the transaction by the payment device. At 316 it is determined whether the result of the calculations performed at 314 matches the security code generated for the transaction by the payment device. If so, the estimated ATC value is taken, at least for the time being, as confirmed, and the corresponding high-order digits are temporarily stored as indicated at 318.

Following 318 (or directly following 316 if at 316 it is determined that the result of the calculation performed at 314 did not match the security code) is decision block 320. At decision block 320, it is determined whether there are any more possible ATC values for which the loop of 310-316 has not yet be performed. (It should be understood that "possible ATC values" refers to all numbers having the same low-order digits reported for the transaction and within the range of possible ATC values. A typical range of ATC values is 1-65536.) If all possible ATC values for the transaction have not yet been checked by the encryption calculations (step 314), then the process loops back to 310 (or to 312) from 320. For example, after the initial estimated value fails, there may be a simple search pattern backward and forward through the field of possible values until a value that "works" is found, or the possible values are exhausted. In some embodiments, no further possible ATC values are checked once one has resulted in a match with the received security code. In other embodiments, all possible ATC values are checked within a range (i.e., within 500 or 1,000) of the initially estimated ATC value. In some embodiments, every possible ATC value is checked whether or not a potentially correct value has been found at 316.

If all ATC values that are to be checked have been checked, then the process advances from 320 to decision block 322. At 322 it is determined whether one and exactly one ATC value (i.e., the high-order digits thereof) has been found to "work" for all of the transactions available for the currently selected account. If such is the case, the process advances to 324. At 324, the sole ATC value (high-order digits) is set as the ATC data for the currently selected account, so that ATC synchronization has been successfully performed for the currently selected account. However, if no ATC value, or more than one ATC value, has been found to "work" for all transactions available for the currently selected account, then the process advances from 322 to 326. At 326, the account in question may be flagged for further action, including for example issuance of a new payment device for the account. It may also be the case that there remains too great a possibility that the ATC value that worked is incorrect. In such a case the account may be flagged so that the ATC value is checked further at a time when more transactions have become available.

The confirmed transaction count value may be used in connection with real time processing of subsequent authorization requests to verify the security codes included with the subsequent requests.

It may be quite desirable that the batch of authorization requests include two or more transactions for each account, since this may greatly reduce the likelihood of falsely "confirming" a transaction count value as matching the ATC actually stored in the payment device.

The number of digits received from the payment device in the authorization request defines the number of possible ATC values that exist with respect to that request. Assuming that the total range of ATCs is 1-65536:

(a) if one low-order digit is received, the number of possible ATC values is 6553;

(b) if two low-order digits are received, the number of possible ATC values is 655;

(c) if three low-order digits are received, the number of possible ATC values is 65;

(d) if four low order digits are received, the number of possible ATC values is 6.

The number of digits in the cryptogram (also referred to as the "security code") determines the probability that any ATC value used in the cryptogram calculation will yield the same result as another ATC value. The fewer digits received in the authorization message, the higher the overall probability that multiple ATC values could yield the same partial cryptogram result. However, by increasing the number of transactions checked, this probability can be significantly reduced.

Processing two or more transactions for each account for the purpose of ATC synchronization may not be as critical where the number of low-order digits of the ATC included in the requests is two low-order digits or more. This is because a larger number of low-order ATC digits in the request greatly reduces the likelihood of a "false positive" arising from the loop of steps 310-316.

The above discussion of FIG. 3B has provided details of process block 306 in FIG. 3A. Referring again to FIG. 3A, if the ATC synchronization has been performed (successfully or unsuccessfully) for the currently selected account, then the process of FIG. 3A advances from 306 to decision block 328. At 328, it is determined whether there remain other accounts in the batch of data for which ATC synchronization has yet to be attempted. If so, then the process of FIG. 3A loops back from 328 to 304 and 306. However, if ATC synchronization has been performed for all of the accounts in the batch, then 330 follows 328, and the process is complete.

As an alternative to the batch, off-line process of FIGS. 3A-3B, ATC synchronization may alternatively be incorporated with real-time processing of authorization requests by the authorization server. A disadvantage of doing so is that it may require modification of the authorization server software, whereas the batch process, particularly if performed by a separate computer, may require little or no modification to the authorization server software. Nevertheless, ATC synchronization using real-time authorization requests is a possible approach. One embodiment of this approach is illustrated in the flow chart shown in FIGS. 4, 4A and 4B.

Figure 4:
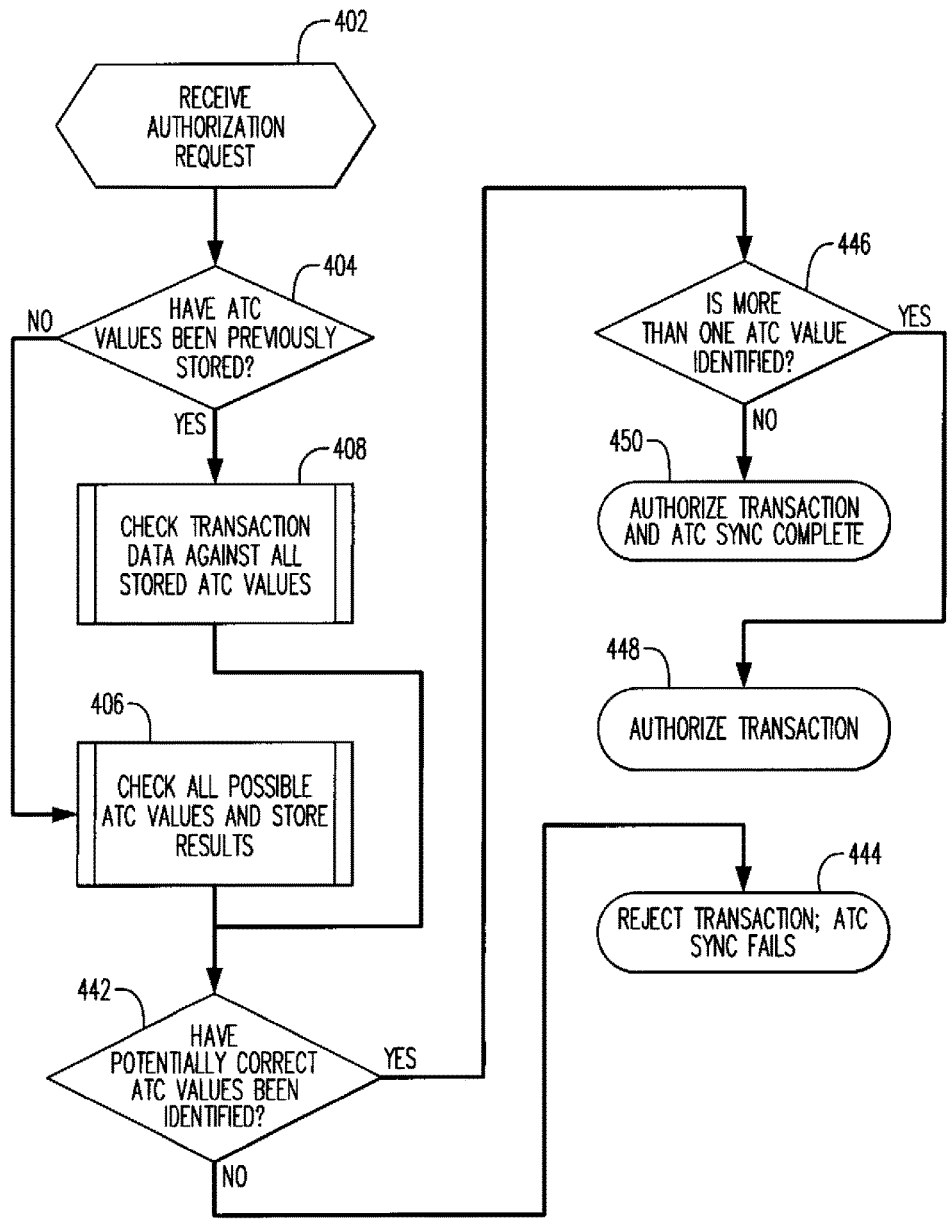
FIGS. 4, 4A and 4B together form a flow chart that illustrates a process that may be performed by the server computer of FIG. 2 in accordance with alternative aspects of the invention.

At 402 in FIG. 4, an authorization request is received. As is customary, the request includes the account number or other identifier for the payment device, a security code, one or more low-order digits of the ATC as stored in the payment device, and the "unpredictable number" generated by the POS terminal for the transaction. Decision block 404 follows 402. At decision block 404, it is determined whether the authorization server has previously stored one or more ATC values as potentially valid for the relevant account (i.e., the account referred to in the authorization request received at 402). If not, then process block 406 follows decision block 404. Contrariwise, if at least one potentially valid ATC value has been stored, then process block 408 follows decision block 404.

Figure 4A:
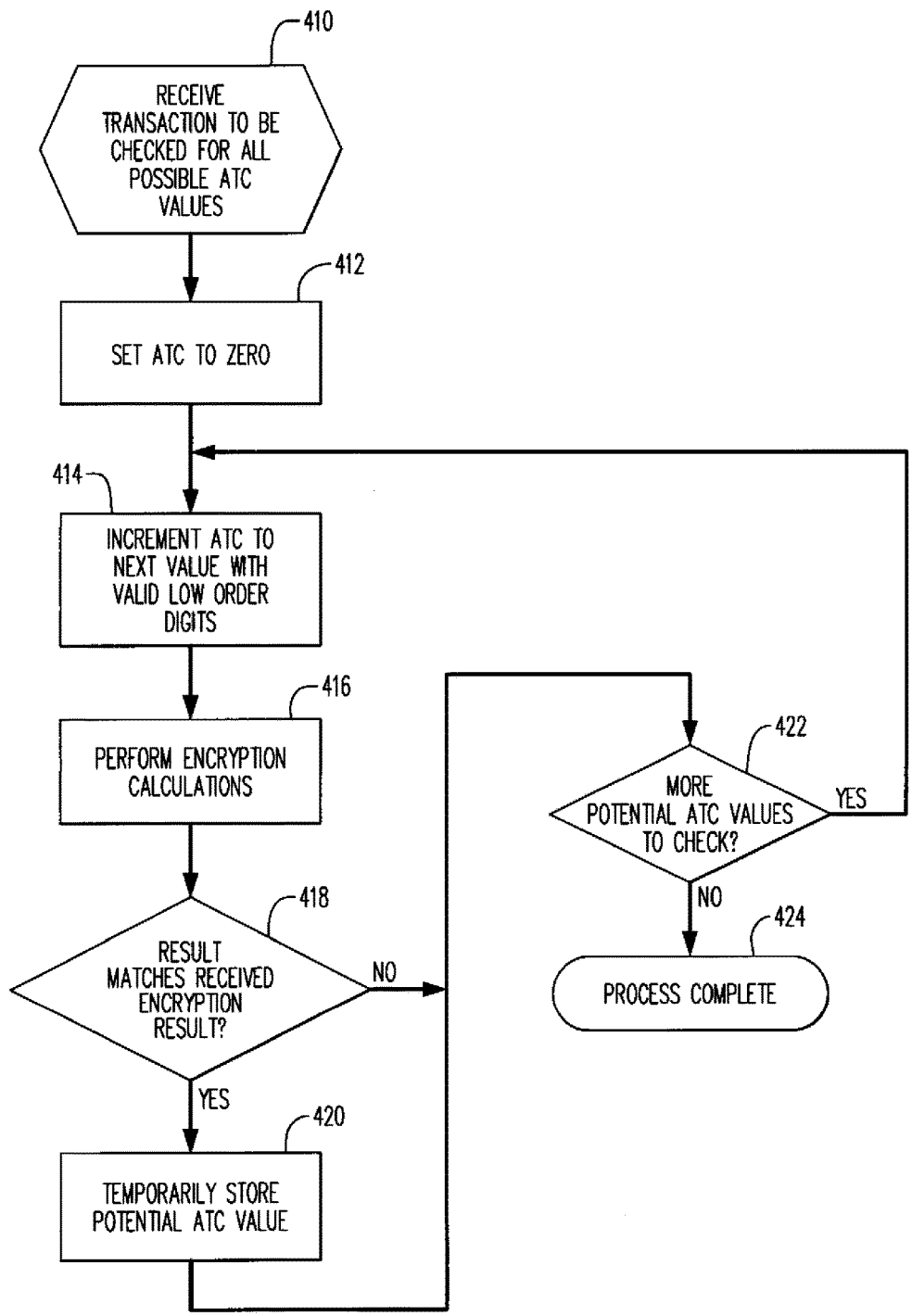

At process block 406, every possible ATC (transaction count) value for the authorization request is checked for potential validity. ("Every possible transaction count value" refers to every value, within the permitted range of ATCs, which has the same low-order digits as the low-order ATC digits included in the authorization request received at 402.) FIG. 4A shows details of process block 406, and will be discussed below.

Figure 4B:
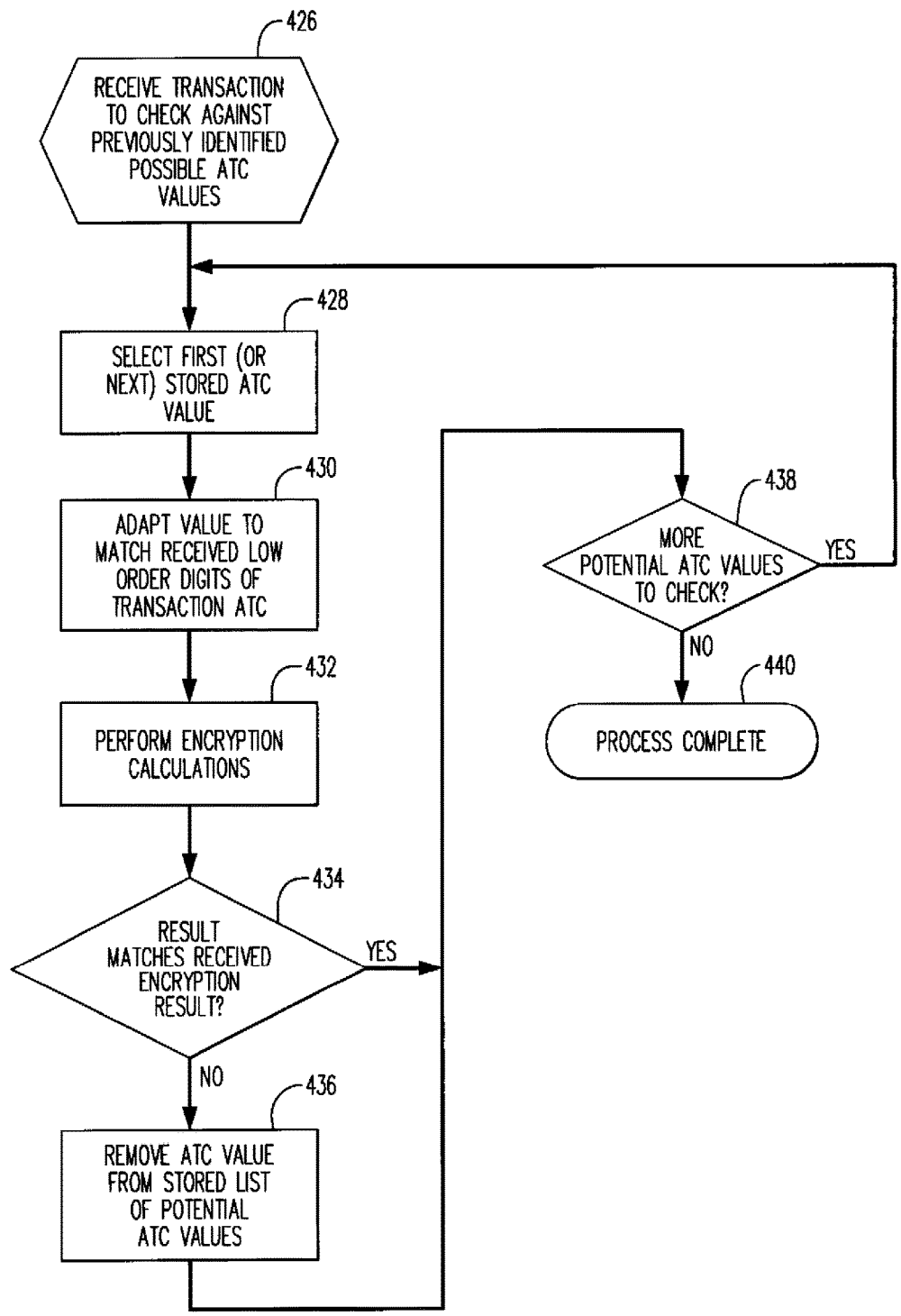

At process block 408, previously stored ATC values are checked against the data provided in the currently active authorization request. FIG. 4B shows details of process block 408 and also will be discussed below.

Turning, then, to FIG. 4A, and a description of process block 406, it is indicated at 410 in FIG. 4A that transaction data for the currently active transaction is received for ATC value checking. Following 410 in FIG. 4A is block 412. At 412, the ATC value to be tested is set to zero. Then, at 414, the ATC value is incremented to the next value which has the low-order digits that correspond to the low-order ATC digits included in the currently active authorization request. Next, at 416, the authorization server uses the possible ATC value provided at 414 as an input in attempting to duplicate the encryption calculation performed for the transaction by the payment device. At 418 it is determined whether the result of the calculations performed at 416 matches the security code generated for the transaction by the payment device. If so, the possible ATC value successfully tested at 416/418 is stored as a potentially correct ATC value, as indicated at 420.

Following 420 (or directly following 418 if at 418 it is determined that the result of the calculation performed at 416 did not match the security code) is decision block 422.

At decision block 422, it is determined whether there are any more possible ATC values for which the loop of 414-418 has not yet been performed. (It should be understood that "possible ATC values" refers to all numbers having the same low-order digits reported for the transaction and within the range of possible ATC values. It will be appreciated that the number of possible ATC values depends on the number of low-order ATC digits included in the authorization request. There will be fewer possible ATC values if a larger number of low-order ATC digits is included in the authorization request.) If all possible ATC values for the transaction have not yet been checked by the encryption calculations (step 416), then the process loops back to 414 from 422.

If all possible ATC values have been checked, then the process of FIG. 4A/block 406 (seen in FIG. 4) is complete, as indicated by the process advancing from decision block 422 to 424 in FIG. 4A.

Reference is next made to FIG. 4B, which provides details of process block 408 in FIG. 4. Block 426 in FIG. 4B represents receipt by the authentication server of an authorization request against which to check ATC values that "worked" for a previous transaction or transactions. Following 426 in FIG. 4B is block 428. At 428 the first previously stored ATC value is selected for checking against the current transaction. Then, at 430 the actual ATC value that is now to be checked is constructed using the low-order digit(s) from the authorization request and the previously stored high-order ATC digits. Next, at 432, the authorization server uses the ATC value constructed at 430 as an input in attempting to duplicate the encryption calculation performed for the transaction by the payment device. At 434 it is determined whether the result of the calculations performed at 432 matches the security code generated for the transaction by the payment device. If such is not the case, the ATC value selected at 428 is dropped from the list of potentially valid ATC values, as indicated at 436.

Following 436 (or directly following 434 if at 434 it is determined that the result of the calculation performed at 432 matched the security code) is decision block 438. At decision block 438, it is determined whether there are any more previously stored ATC values to be checked against the current transaction. If so, then the process loops back to 428 from 438. However, if it is determined at 438 that all previously stored ATC values have been checked against the current transaction, then the process of FIG. 4B/block 408 (as seen in FIG. 4) is complete, as indicated by the process advancing from decision block 438 to 440 in FIG. 4B.

Referring once more to FIG. 4, a decision block 442 follows either process block 406 or process block 408, as the case may be. At 442 it is determined whether at least one potentially valid ATC value was identified in the process block (406 or 408) which preceded decision block 442. If not, then the process terminates at 444, such that the transaction is rejected (i.e., authorization is denied), and it is noted that ATC synchronization has failed. In some embodiments this may result in further action (such as sending a replacement payment device, and/or instituting a fraud investigation). For example, if ATC synchronization has failed with respect to a predetermined number of previous authorization requests for this account, the further action referred to in the previous sentence may be initiated.

Considering decision block 442 again, if a positive determination is made at that point (i.e., if at least one of the potentially correct ATC values was identified at 406 or 408), then decision block 446 follows decision block 442. At decision block 446, it is determined whether more than one potentially correct ATC value was identified at 406 or 408).

If so, then the process terminates at 448, with the requested authorization being granted (assuming of course that there is adequate credit/funding in the account to support the requested transaction). Otherwise (i.e., if only one potentially correct ATC value was identified at 406 or 408), then the process completes at 450 after decision block 446. At 450 it is noted that ATC synchronization has been successfully completed (with the single identified correct ATC value), and the requested authorization is granted (assuming as before that there is adequate credit/funding in the account to support the requested transaction). The single identified ATC value is stored in association with the data for the account for future use in verifying the security codes that will be received, in connection with future authorization requests.

Figure 5A:
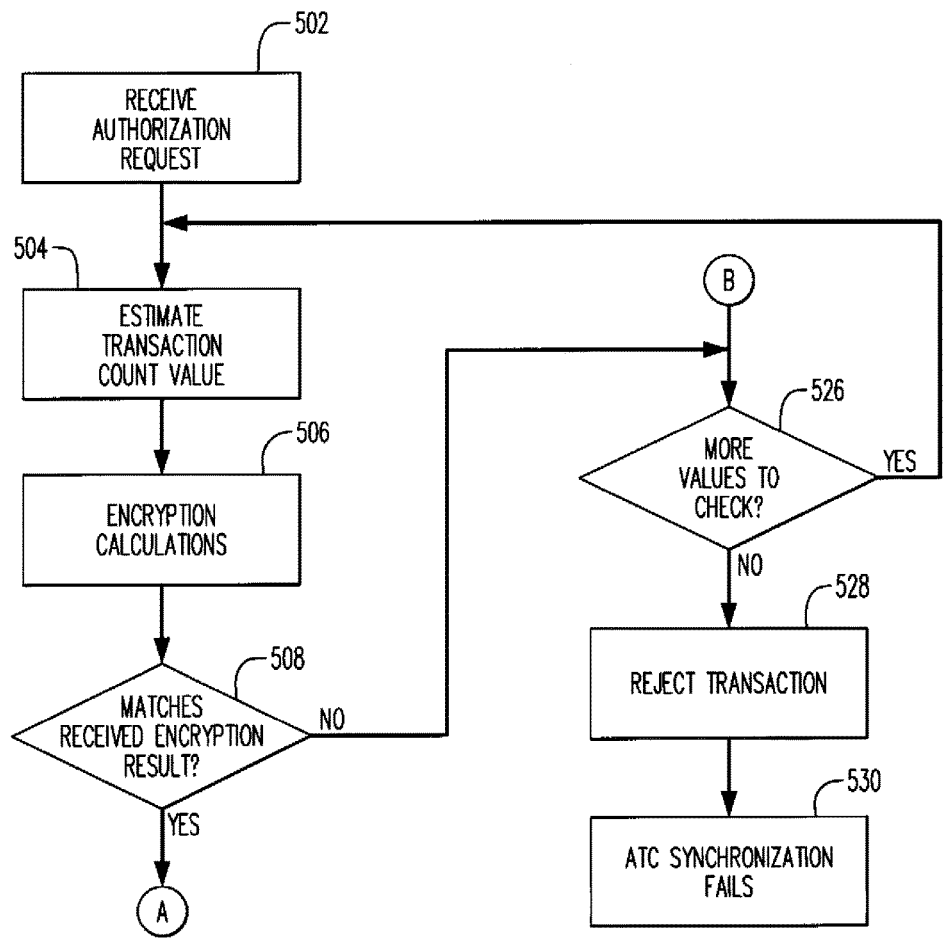
FIGS. 5A and 5B together form a flow chart that illustrates another alternative process that may be performed by the server computer of FIG. 2 in accordance with aspects of the invention.
Figure 5B:
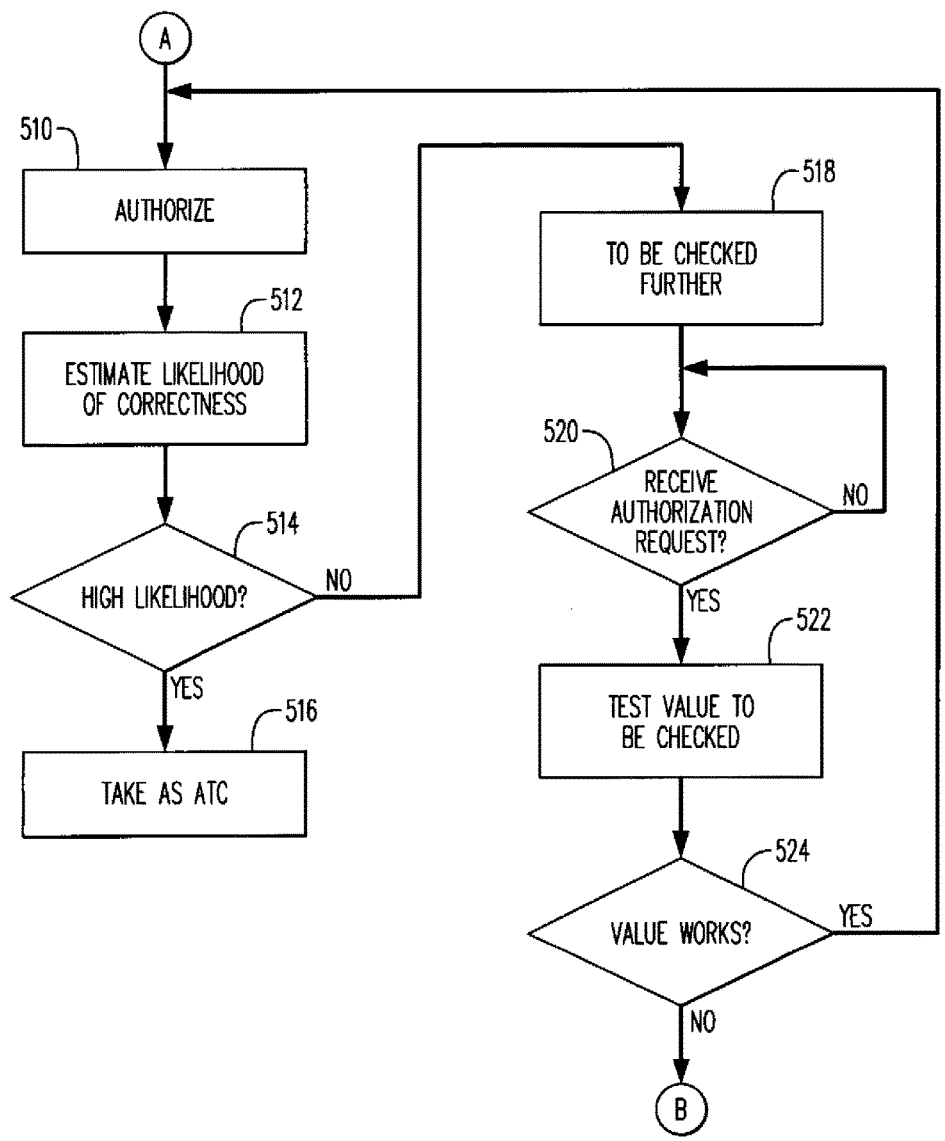

An alternative "real-time" ATC synchronization approach that would also be runnable on the authorization server is illustrated in FIGS. 5A and 5B. This approach may be preferable to that of FIGS. 4-4A-4B in the event that transaction processing bandwidth in the authorization server is not sufficient to comfortably support the practice (406 in FIG. 4) of testing every possible transaction account value for the first authorization request with ATC sync processing for an account.

According to the process of FIG. 5A-5B, at 502 (in FIG. 5A), an authorization request is received. As is customary, the request includes a security code, one or more low-order digits of the ATC as stored in the payment device, and the "unpredictable number" generated by the POS terminal for the transaction. Next, at 504, the authorization computer estimates the transaction count value that was used for the current transaction by the payment device in question. For the low-order digit(s) of the estimated ATC value, of course the low order digit(s) supplied with the authorization request data are used. To estimate the high order digits, for example, the authorization server may consider the date of the transaction and the date on which the payment device was issued, and may use the typical number of transactions performed by a payment device in a period of time of such length.

Step 506 follows 504. At 506, the authorization server may use the estimated ATC value as an input in attempting to duplicate the encryption calculation performed for the transaction by the payment device. At 508 it is determined whether the result of the calculations performed at 506 matches the security code generated for the transaction by the payment device. If so, the estimated ATC value is taken as being possibly correct and the requested authorization is granted (assuming of course that there is adequate credit/funding in the account to support the requested transaction), as indicated at block 510 (FIG. 5B).

The process advances in FIG. 5B from 510 to 512. At 512, it is estimated how likely it is that the ATC value which "worked" at 506-508 actually represents the ATC value stored in the payment device which initiated the authorization request. The likelihood that the ATC value is correct depends on factors such as the number of low-order digits of the ATC that were received in the authorization request, the number of digits in the security code, and the number of transactions for which the successfully tested ATC value has "worked". (At the present point in the discussion of FIGS. 5A-5B, it is assumed that the successfully tested ATC value has only been tested against one transaction.)

The process advances in FIG. 5B from 512 to decision block 514. At decision block 514 it is determined whether the likelihood that the successfully tested ATC value is correct is sufficiently high to justify assuming it to be correct. If so, then it is stored (516) as a confirmed ATC value, for use in checking security codes in future transactions.

If at decision block 514 a negative determination is made (i.e., if there is not a sufficiently high likelihood that the successfully tested ATC value was correct), then the process advances from 514 to 518. At 518 it is determined that the successfully tested ATC value should be tested against the data included in at least one future authorization request for the account in question. Accordingly, the process advances in FIG. 5B from 518 to decision block 520, at which it idles (with respect to the account in question) until another authorization request is received for the account. Once another authorization request is received for the account in question, the process advances to 522. At 522 the successfully tested ATC value is tested against the data included in the newly received authorization request. That is, a "regenerated" ATC value is now produced, using the high-order digits of the successfully tested ATC value, and the low-order ATC digit(s) included in the newly received authorization request. Then encryption calculations are performed based on the "regenerated" ATC value and the other data in the newly received authorization request. It is then determined, at decision block 524, whether the "regenerated" ATC value "works", i.e., whether the encryption calculations using the "regenerated" ATC value produced a result that matches the security code included in the newly received authorization request. If so, the process loops back to 510 etc., to authorize the new transaction (assuming adequate credit/funding) and to again consider whether there is a sufficiently high likelihood that the "regenerated" ATC is correct.

Considering again the decision block at 508 (FIG. 5A), if it is determined at that point that the ATC value estimated at 504 and tested at 506 did not "work" (i.e., the result of the encryption calculations using the estimated ATC value did not match the security code included in the authorization request received at 502), then decision block 526 (FIG. 5A) follows decision block 508. At decision block 526, it is determined whether there remain possible ATC values for the authorization request received at 502 that have not yet tested. If there remain untested possible ATC values, then the process loops back from 526 to 504. However, if no untested possible ATC values remain for the authorization request received at 502, then the process advances in FIG. 5A from decision block 526 to 528. At 528, the transaction is rejected (i.e., authorization is denied), and it is also determined that ATC synchronization has failed, at least with respect to the current transaction. In some embodiments this may result (step 530) in further action (such as sending a replacement payment device, and/or instituting a fraud investigation). For example, if ATC synchronization has failed with respect to a pre-determined number of previous authorization requests for this account, the further action referred to in the previous sentence may be initiated.

Considering again the determination at decision block 524 (FIG. 5B), if a negative determination is reached at that point, the process branches to decision block 526 (FIG. 5A).

One possible scenario that may occur with the process of FIGS. 5A-5B is that:

(a) an ATC value is found that "works" for the first request;

(b) the ATC value of (a) fails (after regeneration) to "work" for the second request;

(c) a different ATC value is found that "works" for the second request; and (d) the ATC value of (c) is regenerated to be tested against the data from the first request and then "works" for the first request.

With one or more of the processes described in FIGS. 3A-3B, or 4-4A-4B or 5A-5B, the ATC synchronization computer 112 (if present) or the authorization server 108 is able to determine with a certain degree of confidence what transaction count value is currently stored in the payment device 106, by duplicating the encryption calculation result which produced the security code(s) included in one or more authorization requests. The authorization server is then able store the confirmed transaction count value for further use, so that the record for the account in the database 214 is synchronized with the payment device in regard to the transaction count value.

As used herein and in the appended claims, the phrase "estimating a transaction count value" includes any method of selecting a notional transaction count value to be used in an encryption calculation at the authorization server or at an ATC synchronization computer. That phrase includes brute force selection of all possible transaction counts in (ascending or descending) sequence—of the high order digits—as well as educated guessing of the transaction count value based on information such as the length of time since issuance of the payment device in question. However, notwithstanding the foregoing, "estimating a transaction count value" does not include the conventional practice of regenerating a transaction count value based on transaction count information stored in the authorization server and the low-order digit(s) of the transaction count included in the authorization request, as described in a published paper entitled "PayPass Information Paper: ATC Regeneration and Tracking", issued by MasterCard International Incorporated under date of Oct. 26, 2004.

The term "payment device" refers to a card or other device that interacts with a POS terminal to charge a payment transaction to an account associated with the payment device. Furthermore, "payment device" shall also refer to a device not directly used for a financial transaction, but used to exchange information to increment or decrement rights or entitlements, as in the case of tickets (e.g., for transport, venue entry), tokens and the like.

A "result" of an encryption and/or cryptographic calculation should be understood to include a partial or truncated result.

When a plural number of digits is referred to in the accompanying claims, that reference shall also be deemed to refer to a single digit.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A transaction count synchronization method comprising:

(a) receiving and storing, in a transaction authorization computer, data related to two or more payment transaction authorization requests originated from a payment device, the data for each request including (i) one or more low-order digits of a transaction count value maintained by the payment device, and (ii) a result of an encryption calculation performed by the payment device for the request;

(b) for each request, using the one or more low-order digits to estimate in the transaction authorization computer the transaction count value;
(c) for each request, using the estimated transaction count value to perform a subsequent encryption calculation in the transaction authorization computer;
(d) for each request, comparing, in the transaction authorization computer, a result of the subsequent encryption calculation with the encryption calculation result received for the request;
(e) for each request, when the result of the subsequent encryption calculation does not match the received encryption calculation result, repeating steps (b), (c) and (d) in the transaction authorization computer until the result of the subsequent encryption calculation matches the received encryption calculation result;
(f) storing the estimated transaction count value in the transaction authorization computer as a confirmed transaction count value when the result of the subsequent encryption calculation matches the received encryption calculation result; and
(g) comparing, by the transaction authorization computer, the confirmed transaction count value for one of said requests with the confirmed transaction count value for another one of said requests to confirm synchronization of transaction count values.

2. The method of claim 1, wherein said encryption calculations each have as additional inputs an initialization value for the respective request and an unpredictable number generated for the respective request by a point of sale terminal.

3. The method of claim 1, wherein said estimating of said transaction count value maintained by the payment device is based at least in part on an issue date of the payment device.

4. A transaction count synchronization method comprising:
receiving in a transaction authorization computer data for a first payment transaction authorization request originated from a payment device, the data including (i) one or more low-order digits of a transaction count value maintained by the payment device, and (ii) a result of an encryption calculation performed by the payment device for the first request;
using encryption calculations in the transaction authorization computer to test possible transaction count values having said low-order digits to determine a one of said possible transaction count values that produces a result that matches said received result;
storing, in the transaction authorization computer, said transaction count value that satisfies said test as a first saved transaction count value;
after storing in the transaction authorization computer said first saved transaction count value, receiving data in the transaction authorization computer for a second payment transaction authorization request originated from the payment device, said data for said second request including (i) one or more low-order digits of a transaction count value maintained by the payment device at a time of the second request, and (ii) a result of an encryption calculation performed by the payment device for the second request;
generating in the transaction authorization computer a first regenerated transaction count value using high-order digits of the first saved transaction count value and the low-order digits from the second request;
using an encryption calculation in the transaction authorization computer to test the first regenerated transaction count value to determine whether the first regenerated transaction count value produces the result of the encryption calculation performed by the payment device for the second request; and
when the first regenerated transaction count value does not produce the result of the encryption calculation performed by the payment device for the second request:
(a) using encryption calculations in the transaction authorization computer to test possible transaction count values having said low-order digits of said second request to determine a one of said possible transaction count values having said low-order digits of said second request that produces a result that matches said received result for said second request;
(b) generating in the transaction authorization computer a second regenerated transaction count value using (i) said low-order digits from said first request; and (ii) high-order digits of the determined one of said possible transaction count values having said lower-order digits of said second request that produces a result that matches said received result of the encryption calculation performed by the payment device for the second request; and
(c) using an encryption calculation in the transaction authorization computer to test the second regenerated transaction count value to determine whether the second regenerated transaction count value produces the result of the encryption calculation performed by the payment device for the first request to confirm synchronization of transaction count values.

5. The method of claim 4, wherein said encryption calculations each have as additional inputs an initialization value for the respective request and an unpredictable number generated for the respective request by a point of sale terminal.

6. An apparatus comprising:
a transaction authorization processor; and
a memory coupled to said transaction authorization processor and storing program instructions, said transaction authorization processor operative with said program instructions to:
(a) receive and store data related to two or more payment transaction requests originated from a payment device, the data for each request including (i) one or more low-order digits of a transaction count value maintained by the payment device, and (ii) a result of an encryption calculation performed by the payment device for the request;
(b) for each request, use the one or more low-order digits to estimate the transaction count value;
(c) for each request, use the estimated transaction count value to perform a subsequent encryption calculation;
(d) for each request, compare a result of the subsequent encryption calculation with the encryption calculation result received for the request;
(e) for each request, when the result of the subsequent encryption calculation does not match the received encryption calculation result, repeat steps (b), (c) and (d) until the result of the subsequent encryption calculation matches the received encryption calculation result;
(f) store the estimated transaction count value as a confirmed transaction count value when the result of the subsequent encryption calculation matches the received encryption calculation result; and (g) compare the confirmed transaction count value for one of said requests with the confirmed transaction count value for another one of said requests to confirm synchronization of transaction count values.

7. The apparatus of claim 6, wherein said encryption calculations each have as additional inputs an initialization value for the respective request and an unpredictable number generated for the respective request by a point of sale terminal.

8. The apparatus of claim 6, wherein said estimating of said transaction count value maintained by the payment device is based at least in part on an issue date of the payment device.

9. An apparatus comprising:
a transaction authorization processor; and
a memory coupled to said transaction authorization processor and storing program instructions, said transaction authorization processor operative with said program instructions to:
receive data for a first payment transaction authorization request originated from a payment device, the data including (i) one or more low-order digits of a transaction count value maintained by the payment device, and (ii) a result of an encryption calculation performed by the payment device for the first request;
use encryption calculations to test possible transaction count values having said low-order digits to determine a one of said possible transaction count values that produces a result that matches said received result;
store said transaction count value that satisfies said test as a first saved transaction count value;
after storing said first saved transaction count value, receive data for a second payment transaction authorization request originated from the payment device, said data for said second request including (i) one or more low-order digits of a transaction count value maintained by the payment device at a time of the second request, and (ii) a result of an encryption calculation performed by the payment device for the second request;
generate a first regenerated transaction count value using high-order digits of the first saved transaction count value and the low-order digits from the second request;
use an encryption calculation to test the first regenerated transaction count value to determine whether the first regenerated transaction count value produces the result of the encryption calculation performed by the payment device for the second request; and
when the first regenerated transaction count value does not produce the result of the encryption calculation performed by the payment device for the second request:
(a) use encryption calculations to test possible transaction count values having said low-order digits of said second request to determine a one of said possible transaction count values having said low-order digits of said second request that produces a result that matches said received result for said second request;
(b) generate a second regenerated transaction count value using (i) said low-order digits from said first request; and (ii) high-order digits of the determined one of said possible transaction count values having said lower-order digits of said second request that produces a result that matches said received result of the encryption calculation performed by the payment device for the second request; and
(c) use an encryption calculation to test the second regenerated transaction count value to determine whether the second regenerated transaction count value produces the result of the encryption calculation performed by the payment device for the first request to confirm synchronization of transaction count values.

10. The apparatus of claim 9, wherein said encryption calculations each have as additional inputs an initialization value for the respective request and an unpredictable number generated for the respective request by a point of sale terminal.

* * * * *